United States Patent [19]
Barthelemy et al.

[11] Patent Number: 5,991,652
[45] Date of Patent: Nov. 23, 1999

[54] PROTECTIVE TWO POSITION SHELL FOR AN INFRARED THERMOMETER

[75] Inventors: Matthew Barthelemy, Palo Alto; Stuart Seydo Kurdi, San Diego; Sonja Andrea Schiefer, Palo Alto; Stephen George Zmina, Poway, all of Calif.

[73] Assignee: Thermoscan Inc., San Diego, Calif.

[21] Appl. No.: 08/819,676

[22] Filed: Mar. 17, 1997

[51] Int. Cl.⁶ ........................................................ A61B 5/00
[52] U.S. Cl. ............................ 600/474; 600/549; 374/208
[58] Field of Search ..................... 600/474, 549; 374/121, 208, 209, 210, 158

[56] References Cited

U.S. PATENT DOCUMENTS

| | | |
|---|---|---|
| Re. 34,507 | 1/1994 | Egawa et al. . |
| Re. 34,789 | 11/1994 | Fraden . |
| D. 338,456 | 8/1993 | Brunner et al. . |
| D. 388,783 | 1/1998 | Harden et al. . |
| D. 396,421 | 7/1998 | Barthelemy et al. . |
| 4,253,334 | 3/1981 | Hakansson et al. . |
| 4,602,642 | 7/1986 | O'Hara et al. . |
| 4,797,840 | 1/1989 | Fraden . |
| 4,895,164 | 1/1990 | Wood . |
| 4,913,150 | 4/1990 | Cheung et al. . |
| 4,993,424 | 2/1991 | Suszynski et al. . |
| 5,017,018 | 5/1991 | Iuchi et al. . |
| 5,088,834 | 2/1992 | Howe et al. . |
| 5,169,235 | 12/1992 | Tominaga et al. . |
| 5,628,323 | 5/1997 | Pompei . |
| 5,653,238 | 8/1997 | Pompei . |
| 5,871,279 | 2/1999 | Mooradian et al. . |

*Primary Examiner*—Scott M. Getzow
*Assistant Examiner*—Shawna J Shaw
*Attorney, Agent, or Firm*—Hopgood, Calimafde, Kalil & Judlowe LLP

[57] ABSTRACT

An infrared thermometer is disclosed comprising a first housing member having an interior chamber, and housing a sensor mounted within the chamber for sensing temperature change and generating an indicative electrical signal, means for directing infrared radiation from the object to be measured to the sensor, a shutter assembly for controlling the passing of infrared radiation to the sensor, an ambient temperature sensor for sensing ambient temperature within the interior chamber and generating an electrical signal indicative thereof, an electrical circuit for processing the electrical signals to calculate the temperature of the object to be measured, and an indicator for indicating the calculated temperature. A second hollow housing member operatively connected to the first housing member by a hinge. The second housing member is adapted to serve as a protective area for the probe of the IR thermometer inside the hollow configuration thereof and to serve as the lower portion of a pistol type grip when the IR thermometer is being operated by a user.

18 Claims, 8 Drawing Sheets

PROTECTIVE TWO POSITION SHELL FOR AN INFRARED THERMOMETER

RELATED APPLICATIONS

This application is related to U.S. patent application Ser. No. 08/819,496 filed Mar. 17, 1997, (attorney docket 1511-033) the disclosure of which is herein incorporated by reference.

BACKGROUND OF THE INVENTION

The present invention relates generally to infrared (IR) thermometers, more particularly to an infrared thermometer and method for measuring the temperature of an object and most particularly to an infrared thermometer for measuring the temperature of an object that has a rotatable protective housing operatively connected to the IR component housing.

Infrared thermometry has been available for many applications based on a variety of designs. Typically, these early thermometer designs were developed for testing temperature of difficult to reach objects or objects operating at fairly high temperatures—such as the interior of an industrial oven. Such exotic environments were well suited to infrared detection due to the large temperature differences between ambient and the subject object and for the reason that there were few alternatives.

More recently, infrared temperature detection techniques have found application in clinical temperature measurement and specifically the diagnostic measurement of patient body measurement by detecting the infrared emissions radiating from the tympanic membrane of the ear. This membrane is found to comprise a temperature highly correlated to actual body temperature and its measurement with infrared detection techniques has become a highly accurate reading taken in a matter of seconds.

The present invention application is directed to improvements to the prior IR thermometers disclosed in U.S. Pat. No. 4,797,840 and its reissue RE. 34,789, and U.S. Pat. No. 5,368,038 both assigned to the assignee of the present invention, the disclosure of each is hereby incorporated by reference.

As disclosed in the above mentioned patents, the temperature of an object, such as the human body, has been determined by using a contact thermometer or by measuring the naturally radiated energy from the body such as the radiated energy in the far infrared range. The infrared radiation is directly related to temperature of the object and has been used to determine the temperature of the body.

Medical thermometers are useful in the diagnosis and treatment of many diseases. In the past, measurement of a patient's body temperature had been most commonly performed by conventional mercury thermometers. Disadvantages of such thermometers included the amount of time required to obtain accurate readings, a minute or more, and that they needed to be disinfected before each use. Later, electronic thermometers became popular because they required far less time to obtain an accurate temperature reading and the probe of the electronic thermometer was commonly inserted into a protective disposable cover before use. Such electronic thermometers are rapidly reusable and are generally sanitary when used with sanitary sheaths. However, obtaining an accurate reading of a patient's temperature still required as much as 30 seconds, since the temperature is measured through the sanitary sheath that must equilibrate to the patient's temperature. Such thermometers were also generally used orally or rectally.

The auditory canal and the tympanic membrane are also known to be useful for measurement of a patient's internal body temperature. Electronic thermometers for measuring the temperature of the tympanic membrane by directly contacting the tympanic membrane are well known and has been described in many U.S. Patents. However, such devices have proven to have certain disadvantages such as causing discomfort to the patient, inserting the probe without a sheath, thus requiring sterilization between uses in order to decrease the time required for an accurate temperature, or utilizing a sheath or speculum for sanitary purposes while generally increasing the time required to obtain an accurate measurement.

More recently, infrared thermometers avoided the necessity of contacting the location at which temperature is actually being measured and were designed for use in measuring the patient's temperature from the auditory canal and/or from the tympanic membrane. As described in the above-mentioned patents, an infrared detector receives infrared radiation from the auditory canal through an internally polished truncated cone that serves as a shield and an insulator, so that temperature readings are only taken from the auditory canal.

Figure 1:
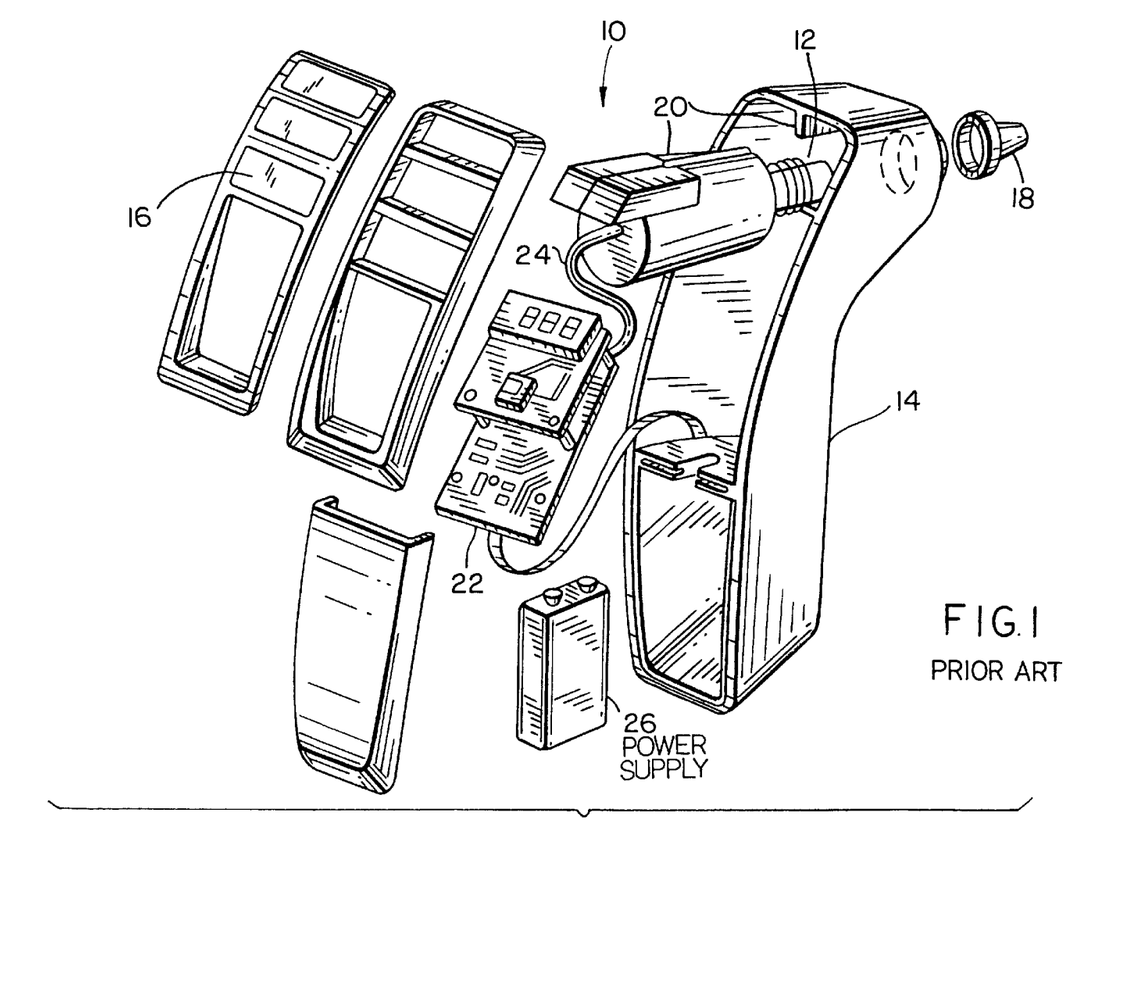
FIG. 1 is an exploded schematic view of a representative prior medical infrared thermometer.

As shown in FIG. 1, a representative schematic of a prior medical infrared thermometer 10 is shown in an exploded view. This thermometer comprises a self-contained, battery powered unit that has probe 12 adapted for insertion into an ear canal, short of the tympanic membrane. Housing member 14 of thermometer 10 is shaped for convenient handling by a user. The thermometer has an actuation button 16 that when depressed triggers the device to take a reading of the infrared radiation from within the ear canal.

Probe 12 at the front of the thermometer is of a shape and dimension that is compatible with the profile of a human ear canal. Before insertion into the canal, probe 12 is covered by protective probe cover 18 that is conventionally fabricated of a thin polymer material that is substantially transparent to light in the near and far infrared spectral ranges.

As shown, electronic circuity 22 is connected to the IR assembly 20 via a cable 24. A power supply 26 in the form of a nine (9) volt battery is connected to the circuit 22 and is typically contained in housing 14. Other conventional components are typically used to complete the encasement of the IR Thermometers' components inside housing 14.

The purpose of the front portion of the probe is to gather infrared light from the tympanic membrane and surrounding tissue. An infrared sensor assembly 20 is positioned remote from the end of the probe, being positioned inside housing member 14 of thermometer 10.

In the past, when not in use, infrared thermometers were typically stored in a second, separate protective unit or a substantially hollow housing member (not shown, but see U.S. Pat. No. 4,602,642 issued to O'Hara et al. as one specific example). During the periods of nonuse, the infrared thermometer having the exposed probe 12 was inserted into the second, separate hollow protective housing such that the probe 12 was encased inside the hollow portion of the second, separate housing member. Additionally, this particular type of separate hollow protective housing member typically included storage provisions for the protective covers for the probe.

Having a totally separate protective housing member for the IR thermometer has proven both inconvenient and expensive. A separate protective housing member is inconvenient because it is not always in near proximity to the user and because it can become separated from the IR thermometer during use. With the two separate housing members used with the prior IR thermometers, after use, the user had to locate the second housing member and insert the IR thermometer probe into the hollow second, separate, protective/storage housing member.

Additionally, the cost of a separate second housing member for protectively storing the infrared thermometer was nearly, if not equal to, the cost of the first housing member less the IR components housed therein. Further, since the separate second housing member occasionally became lost or misplaced, the inconvenience and cost of replacement of second housing members was not inconsequential.

While the above described IR thermometers were clear advances in the art, they were somewhat complex in that they included two separate, housing members, were more expensive to manufacture than believed necessary and had high replacement part costs.

Thus, there is a need for a new improved infrared thermometer and method for measuring the temperature of an object. Such improved infrared thermometer should have a single housing member and include provisions for the protective storage of the IR thermometer during non-use periods; should be more economically manufactured and should eliminate the need for a second, separate housing member used as a separate protective/storage housing and, thus, the need for replacing the second, separate protective/storage housing member(s) when lost.

SUMMARY OF THE INVENTION

It is accordingly one object of the present application to provide a new and improved IR thermometer that is accurate, reliable and economical to manufacture.

Another object of the invention is to provide an IR thermometer for medical use that is compact, inexpensive and convenient and easy to use.

A still further object of the invention is to provide a new and improved infrared thermometer that eliminates the requirement for a separate protective/storage housing member thereby reducing the complexity and cost of the IR thermometer.

In one specific embodiment of the present invention, we provide an infrared thermometer comprising: a first housing member; a sensor, carried by the first housing and responsive to infrared radiation, for generating an electrical signal which exhibits a change in output upon initial receipt of the radiation; means, carried by the first housing, in optical alignment with the sensor, for directing infrared radiation from an object, the actual temperature of which is to be measured, to impinge upon the sensor; means, carried by the first housing, for enabling response of the sensor to the radiation; electrical means carried by the first housing for processing the signal to develop an indication of the actual temperature of the object; a second housing member for protecting exposed internal components positioned in the first housing member when the thermometer is not in use; and hinge means, operatively connecting the first housing member and the second housing member, for rotating the two housing members from about ninety degrees (90°) to about one hundred eighty (180°) with respect to each other.

Other objectives and advantages of the present application will become apparent from the following description, the accompanying drawings and the appended claims.

DETAILED DESCRIPTION OF THE INVENTION

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

As described in U.S. Pat. No. 5,368,038, the medical infrared thermometer is a self-contained, battery powered unit having a probe adapted for insertion into an ear canal, short of tympanic membrane. An actuation button that when depressed triggers the device to take a reading of the infrared radiation from within canal is positioned on the first housing member.

A probe at the front of the thermometer is of a shape and dimension that is compatible with the profile of a human ear canal. Before insertion into the canal, the probe is covered by a protective probe cover that is fabricated of a thin polymer material that is substantially transparent to light in the near and far infrared spectral ranges.

The purpose of the front portion of the probe is to gather infrared light from the tympanic membrane and surrounding tissue. The infrared sensor is remote from the end of the probe, being positioned inside the housing of thermometer.

As shown in FIGS. 2–11, one specific embodiment of the IR thermometer of the present invention is generally designated by the numeral 30. IR thermometer 30 generally comprises a first housing member 32 having an interior chamber 33, wave guide 34, contained in a probe, for directing infrared radiation into the chamber 33, a shutter assembly 36 for controlling the passage of infrared radiation through the wave guide 34, a sensor assembly 38, an ambient temperature sensor 40, and an electronic circuit 42 and a second housing member 50 connected to the first housing member by a hinge 52.

Figure 2:
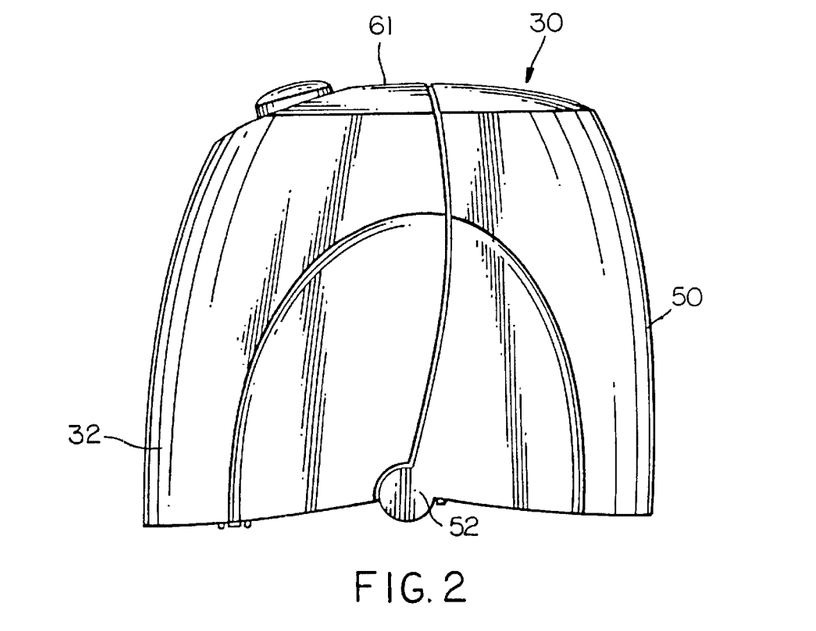
FIG. 2 is a side view of the medical infrared thermometer of the present invention in the closed or stored position.
Figure 3:
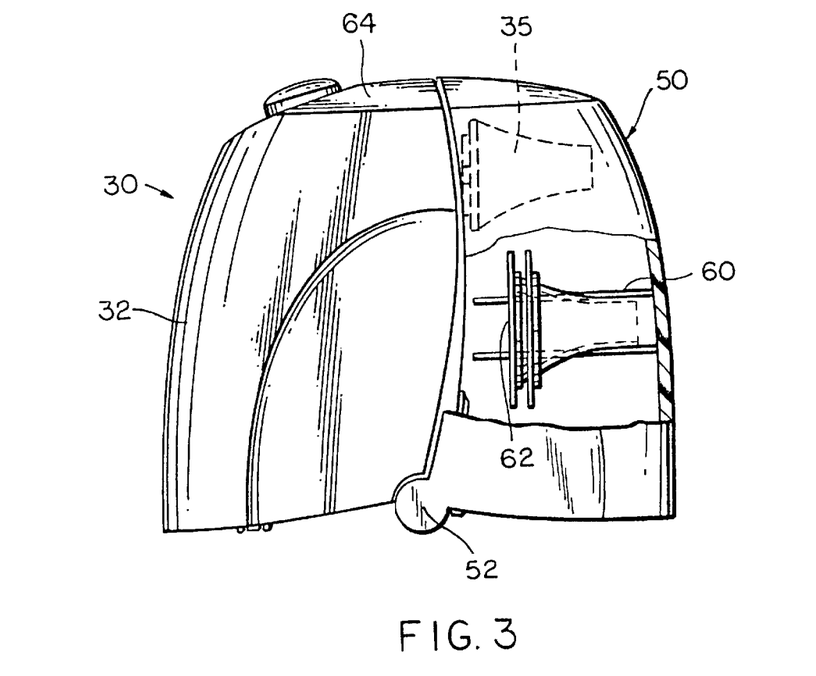
FIG. 3 is a view of the thermometer of FIG. 2 with parts in phantom and parts cut away.
Figure 4:
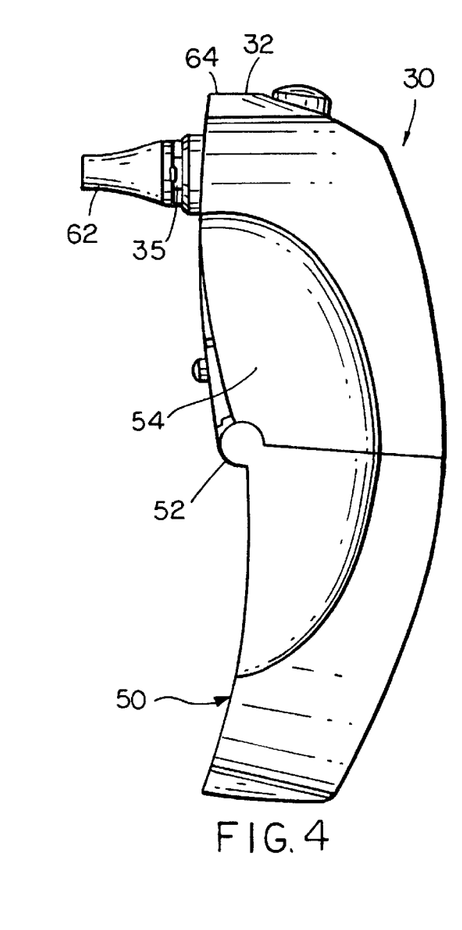
FIG. 4 is a side view of the thermometer of FIG. 1 in the open, ready to use position.
Figure 5:
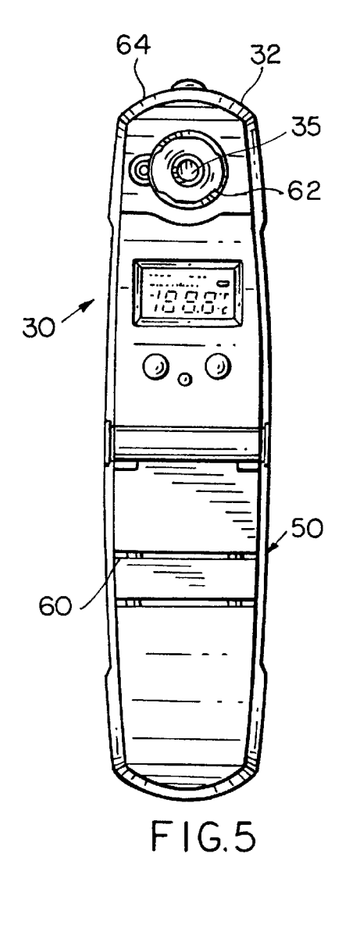
FIG. 5 is a front view of the thermometer of FIG. 4 in the open, ready to use position.

The first housing member 32 having the hinge at one end 54 forms, in combination with the hollow matching second housing member 50, a pistol grip type handle of convenient size for one hand operation when the two housing members 32, 50 are in the open position, as shown in FIG. 4. When the housing members are rotated about one hundred eighty (180°) with respect to each other, the two housing members, in a second position, form a closed unit with the probe being protectively housed inside the hollow interior of the second housing member 50, as best shown in FIGS. 2 and 3.

The second housing member 50 is generally hollow and is operatively connected to the first housing member 32 by the hinge 52. Retainer means 60 (see FIGS. 3 and 5) for storing a plurality of probe covers 62 for future use is formed in the cavity of the second housing 50. The upper end 64 of the first housing member 32 includes the interior chamber for mounting the pyroelectric sensor assembly and the ambient temperature sensor and provides a shield to exterior infrared radiation other than that received through the waveguide in the probe. The waveguide is mounted to the forward side of the first housing member 32 in alignment with the pyroelectric sensor so as to direct or aim infrared radiation from the object to be measured to the pyroelectric sensor mounted within the chamber.

It should be noted that the entire operating components, including the batteries of the IR thermometer of the present invention, are housed in about one half the space as in the prior IR thermometers. Because of the new application specific integrated circuit [the specifics of which are described in U.S. patent application Ser. No. 08/819,496 filed Mar. 17, 1997, (attorney docket 1511-033)] and other components, the power requirement for the IR thermometer of the present application has been significantly reduced and, thus, the battery power supplying that power has similarly been reduced. While the prior IR thermometers typically required a 9-volt battery, the IR thermometer of the present invention requires only three (3) significantly smaller AAA size batteries which occupy about forty (40%) percent less volume in the housing than the one (1) 9-volt battery. Thus, the thermometer of the present invention is clearly more space efficient while maintaining battery life about constant. With the reduction in space required for housing the infrared thermometer components, including the power supply for the IR thermometers, the elimination of the separate protective housing member became viable.

Specifically, all of the infrared related components including the battery were incorporated in an area approximately one half the size of the previous IR thermometer housing. This consolidation enabled the remaining area or portion of the previous IR thermometer housing which had housed the IR components and the batteries to provide the space or area needed to encase the probe in a hollow protective area and thereby eliminated the need for the separate, second protective/storage housing member, as described above.

With the upper half of the old IR thermometer first housing member now housing or containing all the IR components and the battery, the now hollow lower half of the old IR thermometer housing was connected to the upper half by means of a hinge 52 with the bottom half of the old IR thermometer housing being converted to the protective/storage area for the sensitive IR components housed in the upper half of the first housing member and for the probe protective covers 60.

Thus, as seen in FIGS. 3 and 4, when in the closed or non-use position, the probe 35 is positioned inside the hollow lower housing member 50, and when in the open position, the hollow, lower housing member forms part of the convenient pistol-type grip when the combined two housing members 32, 50 open and assume the shape of the first housing member having the IR components housed therein of the prior IR thermometers.

The hinge member 52 connecting the first (upper) 32 and second (lower) 50 housing members of the present invention includes means for locking the probe integral with the first housing member inside the hinge connected second housing member when in the closed or the stored position and for locking the IR thermometer in the open position when the IR thermometer is being operated by a user such that the two housing members form the pistol grip type handle of convenient size for one hand operation.

Figure 6:
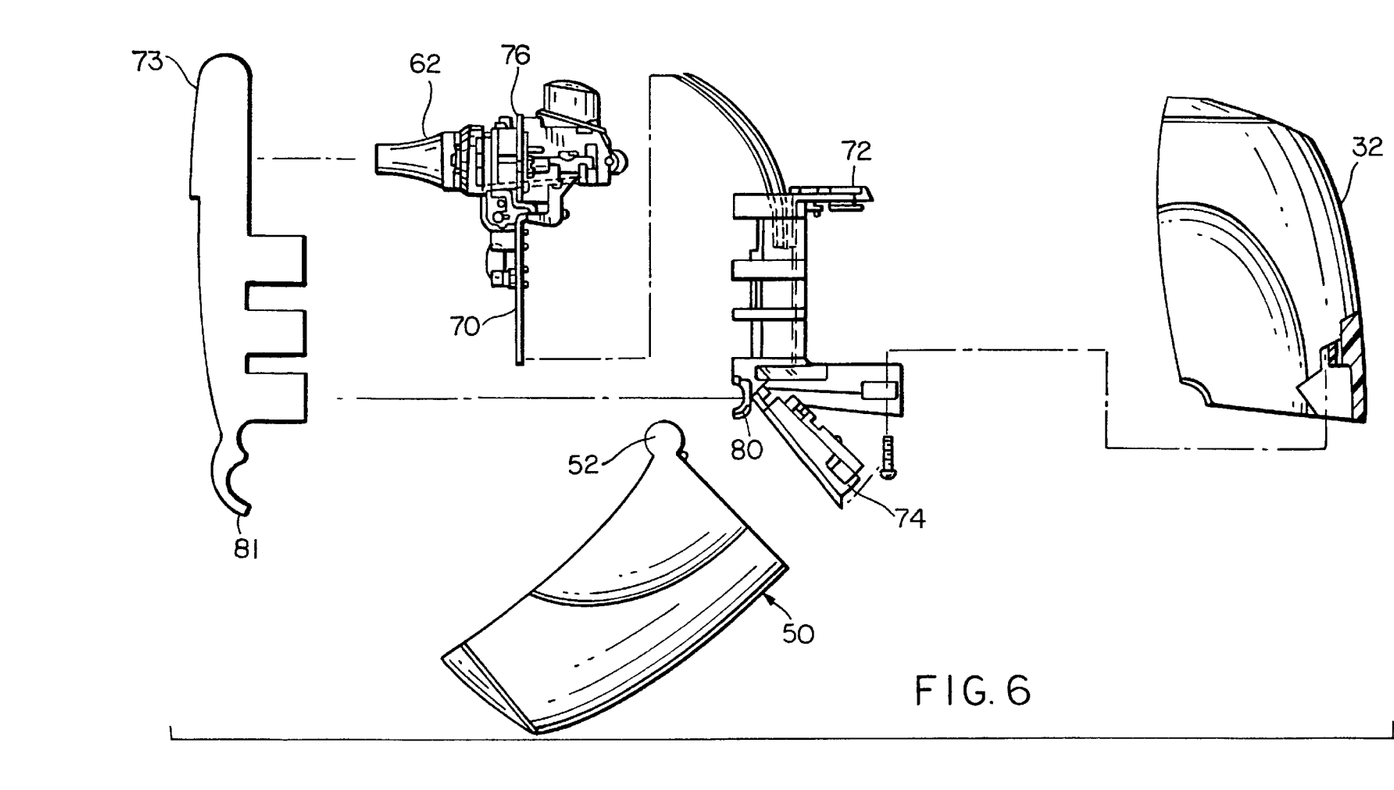
FIG. 6 is an exploded side view of the thermometer of FIGS. 3, 4 and 5 illustrating the principle subcomponents and their assembly relationship.

As shown in FIG. 6, the various components of the infrared thermometer of the present invention are illustrated in an exploded view. The relationship between the infrared components including the circuit board 70, the battery compartment member 72 and the battery door 74 are clearly illustrated. The infrared components including the sensors, the shutter mechanism, etc. are located in the sub-component designated as 76.

Figure 7:
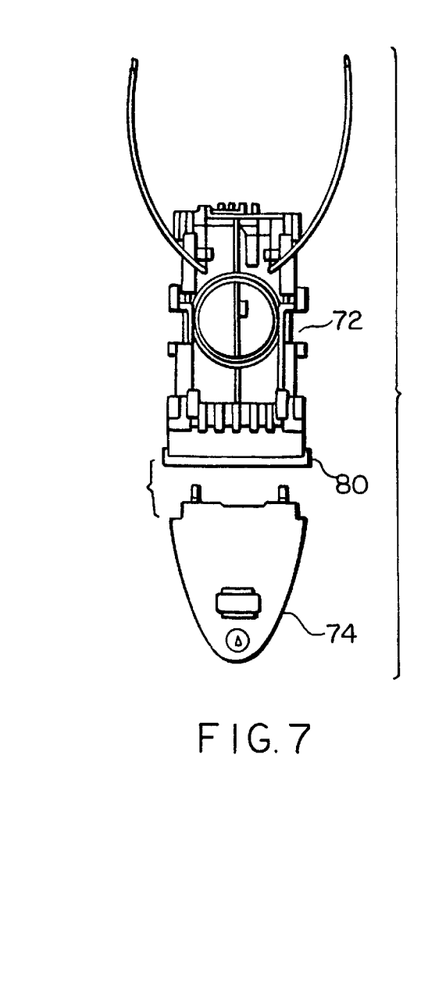
FIG. 7 is a rear view of the battery holder and battery door of the thermometer of FIG. 6.

Referring now to FIG. 7, the battery compartment 74 and the battery door 72 are shown. It should be noted that the hinge 52 comprises two semi-circular members 80, 81, each operatively attached to a first mating member 73 and the mating battery holder 72. The semi-circular members 80, 81 cooperate with two flange members 82, 84, shown in FIG. 8, to form the hinge 52.

Figure 8:
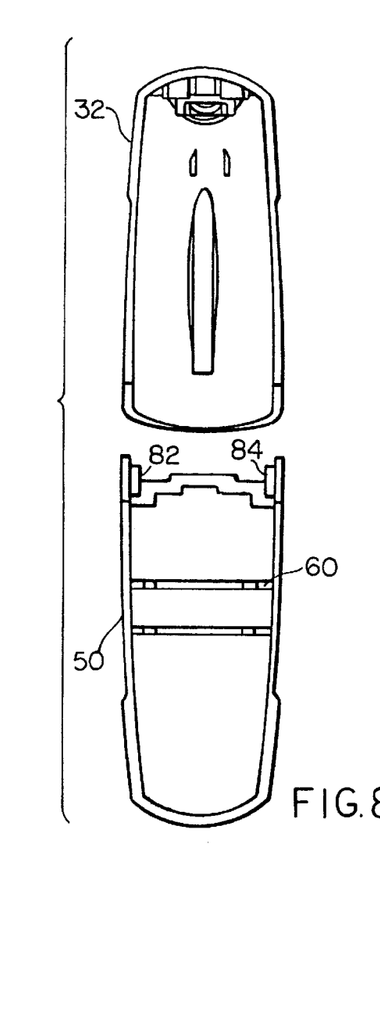
FIG. 8 is a view showing the internal configurations of the first and second housing of the thermometer of the present invention.

FIG. 8 illustrates the internal space of the housing members 32 and 50 prior to the installation of the infrared components and batteries in the battery compartment in the first housing member 32 or the supply of probe covers in the second housing member 50.

Figure 9:
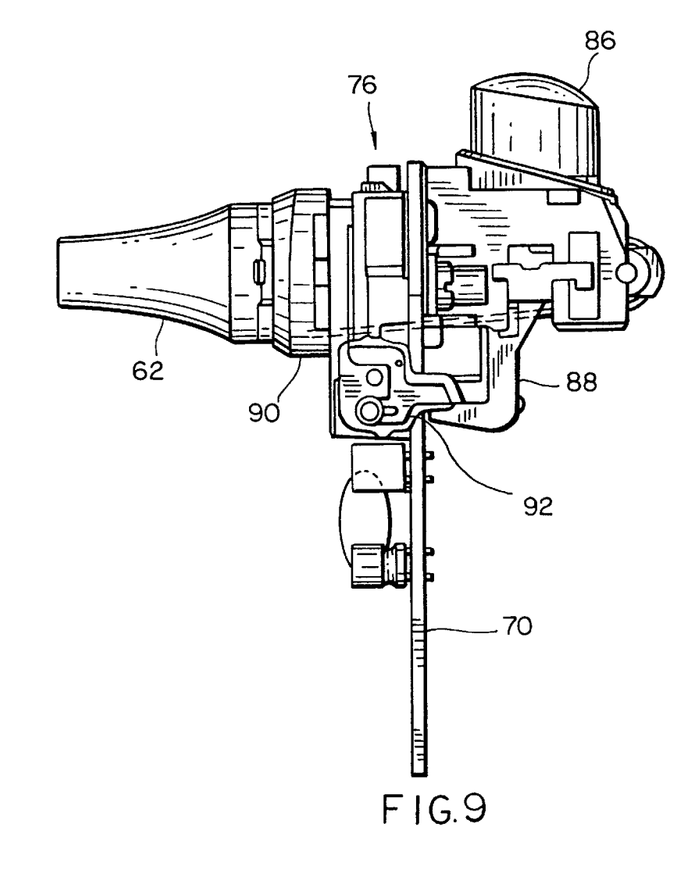
FIG. 9 is a side view of the infrared and electronic circuitry components of the thermometer of the present invention.

FIG. 9 is a close-up view of the infrared and electronic subcomponents 76 of FIG. 6.

The printed circuit board 70 is shown operatively connected to the sensor package and the speculum positioned thereon. An actuator cap 86 is shown connected to an actuator 88 for opening the shutter so that the waveguide can receive the infrared radiation from a target.

Figure 10:
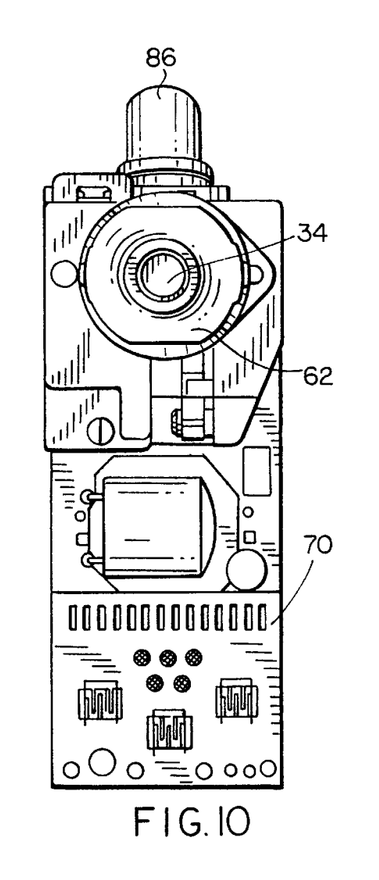
FIG. 10 is view taken at 90° and from the rear of the IR and electronic components of the thermometer of the present invention of FIG. 9.

FIG. 10 is an enlarged front view of the infrared and sensor component including the printed circuit board of FIG. 9.

Figures 11, 11A:
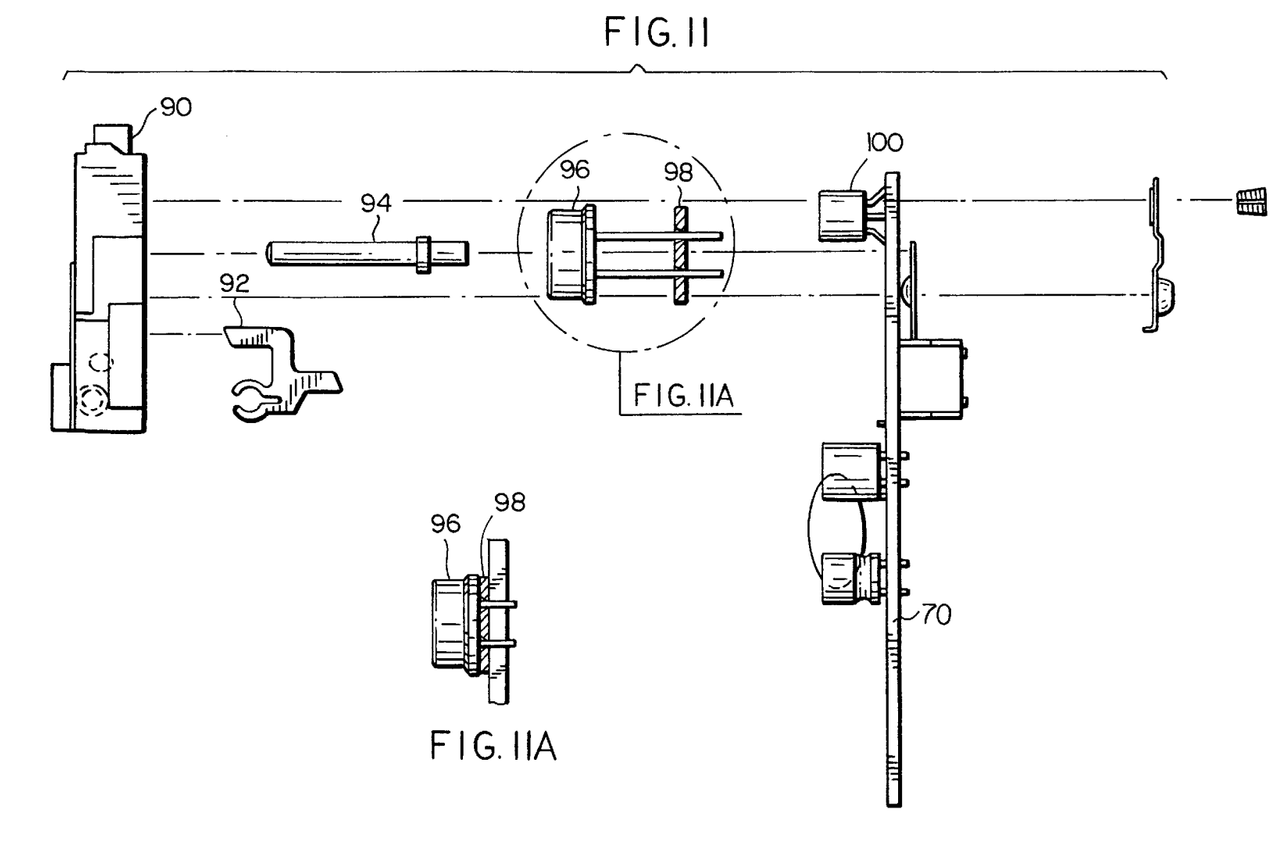
FIG. 11 is an exploded view of the pyro sensor connected to the circuit board and related components of the infrared thermometer of the present invention.

FIG. 11 is an exploded view showing the various components assembled on the printed circuit board 70 of FIGS. 9 and 10. A shutter (not shown) is off the left of the drawing and is separated from the release and the plunger by a rear brick member 90. The release member 92 and a plunger 94 are shown in the exploded position. The pyro sensor 96 is shown as being attached to the circuit board and having a spacer 98 therebetween. The ambient temperature sensor 100 is attached to the circuit board as shown.

Figure 12:
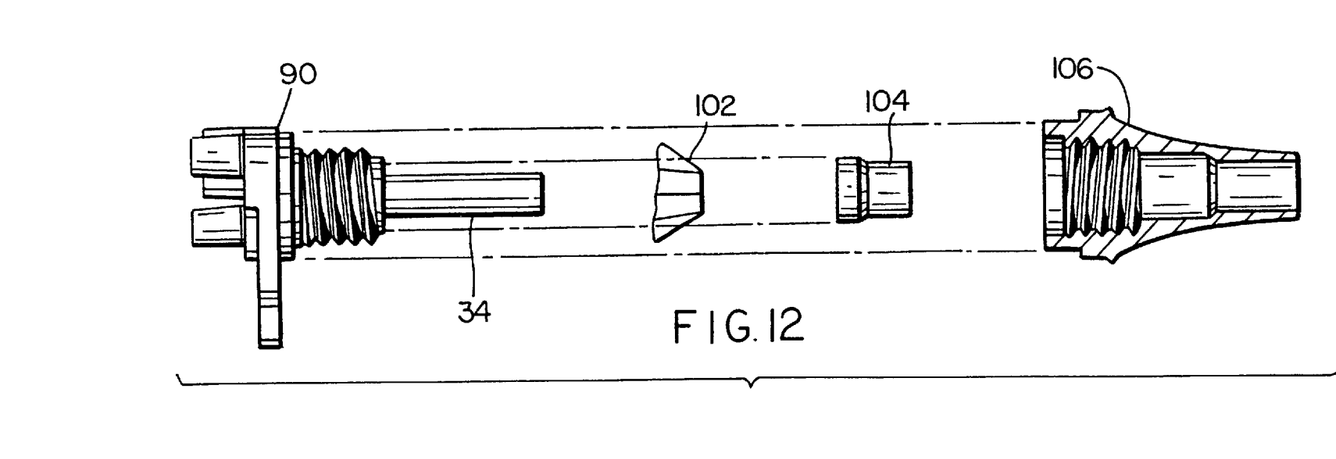
FIG. 12 is an exploded view of the wave guide and the probe assembly of the infrared thermometer of the present invention.

FIG. 12 is an exploded view of the probe where it attaches to the circuit board which comprises the front brick member 90, a waveguide 34, a membrane 102, a membrane retainer 104 and the speculum 106.

Figure 13:
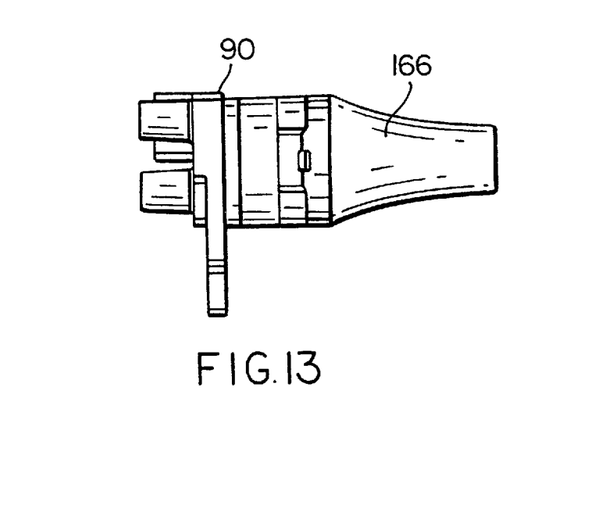
FIG. 13 is a side view of the wave guide and probe connected to the circuit board of the infrared thermometer of the present invention.
Figure 14:
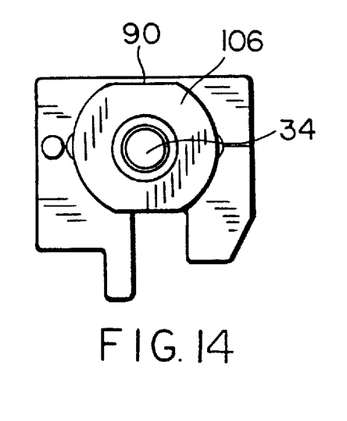
FIG. 14 is a front view of the probe and the assembled wave guide of the present invention.
Figure 15:
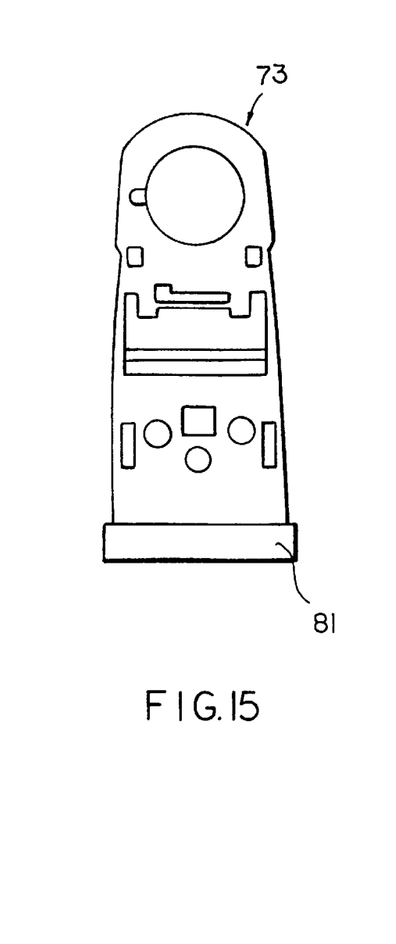
FIG. 15 is a front view of a mating assembly member to the battery holder member of the present invention.

FIG. 13 is a side view of the exploded probe of FIG. 12 and FIG. 14 is a front view of the probe of FIG. 12. The mating member 73 and the battery holder cooperate to position the electronic subcomponents 76 therebetween for positioning inside the space in first housing member 32, as shown in FIG. 8.

Thus, it can be seen that the new improved IR thermometer of the present invention significantly reduces the space required to house the IR components and the batteries, is easier to manufacture, requires two rotatably connected housing members about the size of one of the housing members of prior IR thermometers and is less expensive to manufacture when compared to the prior IR thermometers.

Changes and modifications in this specifically described embodiment can be carried out without departing from the scope of the invention that is intended to be limited only by the scope of the appended claims.

What is claimed is:

1. An infrared thermometer comprising:
   a first housing member;
   a sensor, carried by the first housing and responsive to infrared radiation, for generating an electrical signal which exhibits a change in output upon initial receipt of the radiation;
   means, carried by the first housing, in optical alignment with the sensor, for directing infrared radiation from an object, the actual temperature of which is to be measured, to impinge upon the sensor;
   means, carried by the first housing, for enabling response of the sensor to the radiation;
   electrical means carried by the first housing for processing the signal to develop an indication of the actual temperature of the object;
   a second housing member for protecting exposed optical components positioned in the first housing member when the thermometer is not in use;
   hinge means, operatively connecting the first housing member and the second housing member, for rotating the two housing members to an open position that ranges from about ninety degrees (90°) to about one hundred eighty degrees (180°) with respect to each other; and
   means operatively connected to the hinge means for locking the two housing members in a closed position.

2. The IR thermometer of claim 1, wherein the hinge means further comprises;
   means for locking the two housings in an open position.

3. The infrared thermometer of claim 1 wherein the second housing member further comprises:
   means for storing a plurality of protective disposable covers.

4. The infrared thermometer of claim 2 wherein the first housing member and the second housing member, when in the open position, form a convenient pistol type grip handle for one hand operation of the IR thermometer.

5. An apparatus for measuring the IR radiation associated with a tympanic membrane of an object to be measured without contacting the membrane comprising:
   a first housing member;
   a sensor mounted within the first housing member, wherein the first housing member includes an IR transmission means for passing of IR radiation between the membrane and the sensor;
   means, operatively connected to the sensor, for converting the IR radiation, detected by the sensor, into a signal corresponding to a temperature of the object to be measured;
   means capable of transmitting the IR radiation in sufficient quantities to ascertain the temperature of the object to be measured;
   a second housing member for protecting exposed optical components positioned in the first housing member when the thermometer is not in use;
   hinge means, operatively connecting the first housing member and the second housing member, for rotating the two housing members to an open position that ranges from about ninety degrees (90°) to about one hundred eighty degrees (180°) with respect to each other; and means operatively connected to the hinge means for locking the two housing members in a closed position.

6. The IR thermometer of claim 5, wherein the hinge means further comprises;
   means for locking the two housings in an open position.

7. The infrared thermometer of claim 5 wherein the second housing member further comprises:
   means for storing a plurality of protective disposable covers.

8. The infrared thermometer of claim 6 wherein the first housing member and the second housing member, when in the open position, form a convenient pistol type grip handle for one hand operation of the IR thermometer.

9. In an infrared thermometer of the type capable of measuring clinical temperatures by assessing a select amount of patient infrared radiation, comprising:
   a first housing comprising an optical assembly which includes an infrared collecting element in operative alignment with an infrared sensing element wherein said infrared collecting element extends outward from said housing to allow for collection of said select radiation and assessment of clinical temperature based thereon;
   a second housing pivotally attached to the first housing wherein said second housing includes a hollow portion positioned to enclose said infrared collecting element forming a protective cover thereto when said second housing is pivoted to a closed configuration with said first housing;
   wherein said first and second housings cooperate to form a first, closed configuration that provides a compact protective enclosure to said infrared collecting element to preserve said optical alignment during storage and a second, open configuration that provides an operative position for said infrared collecting element for temperature measurement.

10. The thermometer of claim 9 wherein said second housing forms a portion of a thermometer handle when in the open configuration.

11. The thermometer of claim 10 wherein said first and second housings form a portable compact substantially square shaped structure in said closed configuration.

12. The thermometer of claim 9 wherein said second housing comprises a hollow cavity shaped to enclose the infrared collecting element when in the closed configuration.

13. The thermometer of claim 9 wherein said second housing comprises a disposable cover retainer for holding at least one disposable cover in an enclosed chamber when said thermometer is in the closed configuration.

14. The thermometer of claim 9 wherein all electrical components of said thermometer are located on a compact printed circuit board in said first housing.

15. The thermometer of claim 14 wherein said first housing includes a battery storage cavity aligned with said compact printed circuit board.

16. The thermometer of claim 9 wherein said first housing includes a locking latch for retaining said thermometer in said open configuration.

17. The thermometer of claim 9 wherein said second housing provides protection to a temperature display when in said closed configuration.

18. The thermometer of claim 17 wherein said second housing provides protection to one or more control switches when in said closed configuration.

* * * * *